United States Patent
Zhou et al.

(10) Patent No.: US 9,992,408 B2
(45) Date of Patent: Jun. 5, 2018

(54) PHOTOGRAPHING PROCESSING METHOD, DEVICE AND COMPUTER STORAGE MEDIUM

(71) Applicant: ZTE CORPORATION, Guangdong (CN)

(72) Inventors: Fan Zhou, Guangdong (CN); Qi Zhang, Guangdong (CN); Weiwei Hao, Guangdong (CN)

(73) Assignee: ZTE Corporation, Guangdong (CN)

( * ) Notice: Subject to any disclaimer, the term of this patent is extended or adjusted under 35 U.S.C. 154(b) by 23 days.

(21) Appl. No.: 15/106,068

(22) PCT Filed: May 15, 2014

(86) PCT No.: PCT/CN2014/077600
§ 371 (c)(1),
(2) Date: Jun. 17, 2016

(87) PCT Pub. No.: WO2014/187265
PCT Pub. Date: Nov. 27, 2014

(65) Prior Publication Data
US 2016/0323505 A1 Nov. 3, 2016

(30) Foreign Application Priority Data

Dec. 19, 2013 (CN) .......................... 2013 1 0705814

(51) Int. Cl.
*H04N 5/232* (2006.01)
*H04N 5/262* (2006.01)
(Continued)

(52) U.S. Cl.
CPC ....... *H04N 5/23222* (2013.01); *G06K 9/6201* (2013.01); *G06T 5/005* (2013.01);
(Continued)

(58) Field of Classification Search
CPC ........... H04N 5/23222; H04N 5/23293; H04N 5/2621; G06K 9/6201; G06T 5/005;
(Continued)

(56) References Cited

U.S. PATENT DOCUMENTS

2015/0277706 A1* 10/2015 Chan ................... G06F 3/04842
715/719

FOREIGN PATENT DOCUMENTS

| CN | 102 694 963 | 9/2012 |
| CN | 102 812 490 | 12/2012 |

OTHER PUBLICATIONS

International Search Report for PCT/CN2014/077600 dated Sep. 30, 2014, 4 pages.

* cited by examiner

*Primary Examiner* — Twyler Haskins
*Assistant Examiner* — Fayez Bhuiyan
(74) *Attorney, Agent, or Firm* — Nixon & Vanderhye P.C.

(57) ABSTRACT

Embodiments of the present invention provide a photographing processing method, a device and a computer storage medium. The method includes: receiving at least one instruction for selecting at least one object to be removed in a live view image according to a preset order; acquiring a live view image with selected object to be removed; and removing the at least one object to be removed in the live view image with selected object to be removed sequentially according to the preset order to obtain a photograph.

15 Claims, 5 Drawing Sheets

(51) Int. Cl.
 *G06K 9/62* (2006.01)
 *G06T 5/00* (2006.01)
(52) U.S. Cl.
 CPC ....... *H04N 5/23293* (2013.01); *H04N 5/2621* (2013.01); *G06T 2207/10004* (2013.01); *G06T 2207/10024* (2013.01); *G06T 2207/20021* (2013.01); *G06T 2207/30204* (2013.01)
(58) Field of Classification Search
 CPC . G06T 2207/10004; G06T 2207/10024; G06T 2207/20021; G06T 2207/30204
 See application file for complete search history.

PHOTOGRAPHING PROCESSING METHOD, DEVICE AND COMPUTER STORAGE MEDIUM

This application is the U.S. national phase of co-pending International Application No. PCT/CN2014/077600 filed 15 May 2014 which designated the U.S. and claims priority to CN Patent Application No. 201310705814.0 filed 19 Dec. 2013, the entire contents of each of which are hereby incorporated by reference.

TECHNICAL FIELD

The present disclosure relates to a technical field of electronic imaging, and particularly to a photographing processing method, a photographing device and a computer storage medium.

BACKGROUND

In recent years, mobile phones and cameras with high resolution and high pixel density are widely applied and meet requirements of users for taking photos in daily life. However, in some overcrowded scenic spots, strangers or obstacles often appear in the photos, seriously affecting appreciation of the photos and reducibility of scene.

Currently, a general method for solving such a problem is post-processing the photos through PhotoShop (PS) software. However, the method has the disadvantages of complicated working procedures, delay, inability to operate for most users, etc.

Another method includes: completing profile analysis by using a charge-coupled device (CCD), marking off a first photographing region and a second photographing region, and focusing and shooting to obtain a first image; then, photographing again in an uncaptured region to obtain a second image; and realizing removal of the first photographing region or the second photographing region by overlapping, mosaic and synthesizing two images, thereby removing the obstacles in the first photographing region or the second photographing region. However, in multifarious scenes, when a plurality of obstacles are required to be removed quickly, the method needs multiple photographings and the operation is relatively complex. Moreover, it is generally difficult to find available uncaptured regions, causing difficulty in implementation of the method.

SUMMARY

To solve an existing technical problem, embodiments of the present disclosure provide a photographing processing method, device and a computer storage medium, which are capable of removing a plurality of obstacles in a single photographing process, and are convenient in operation and simple in implementation.

Technical solutions of the present disclosure may be realized by that:

In a first aspect, embodiments of the present disclosure provide a photographing processing method, including:
receiving at least one instruction for selecting at least one object to be removed in a live view image according to a preset order, and acquiring a live view image with selected object to be removed; and
after receiving a shooting instruction, removing the at least one object to be removed in the live view image with selected object to be removed sequentially according to the preset order to obtain a photograph.

In a second aspect, embodiments of the present disclosure provide a photographing processing device, including:
a receiving unit is configured for receiving an instruction for selecting at least one object to be removed in a live view image according to a preset order;
an acquiring unit is configured for acquiring a live view image with selected object to be removed; and
a photograph obtaining unit is configured for removing the at least one object to be removed in the live view image with selected object to be removed sequentially according to the preset order to obtain a photograph.

In a third aspect, embodiments of the present disclosure provide a computer storage medium in which a computer program is stored, wherein the computer program is used for executing the above photographing processing method.

Embodiments of the present disclosure provide a photo shooting processing method and device and a computer storage medium which can be used for obtaining a photograph by selecting objects to be removed in a view finding image according to a preset order, and after receiving a shooting instruction, removing the objects to be removed in the selected view finding image successively according to the preset order. As such, the present disclosure is capable of achieving that a plurality of obstacles are removed in a one-time photo shooting process, and is convenient in operation and simple in implementation.

DETAILED DESCRIPTION

Technical solutions in embodiments of the present disclosure will be clearly and fully described below in combination with drawings in embodiments of the present disclosure.

Figure 1:
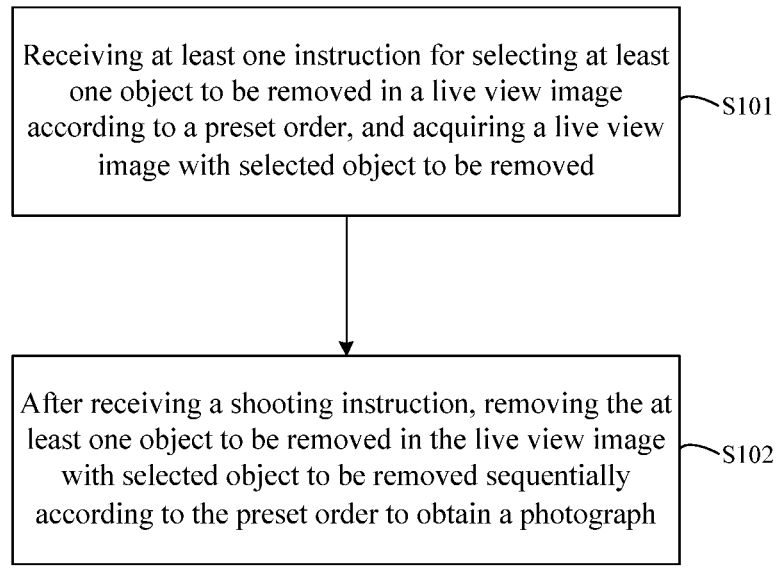
FIG. 1 is a flow diagram showing a photographing processing method provided in embodiments of the present disclosure.

As shown in FIG. 1, a photographing processing method provided in embodiments of the present disclosure can be applied to a terminal device having a digital capture function, such as an intelligent mobile phone, a digital camera, a tablet personal computer, etc. To clearly describe the technical solutions of embodiments of the present disclosure, the method is described by using the digital camera as an example, and it should be noted that it does not mean that the method is only suitable for the digital camera. The method can include:

S101: Receiving, according to a preset order, at least one instruction for at least one object to be removed in a live view image (that is, an image in view finder), and acquiring a selected live view image (that is, a live view image with selected object to be removed).

Exemplarily, when the digital camera is used by a user for photographing, unwanted obstacles may appear usually in the live view image in a view finder frame. In embodiments of the present disclosure, the obstacles are referred to as objects to be removed. It can be understood that the quantity of the objects to be removed in the live view image may be more than one. In an image shown in FIG. 2A, an inner part of a black solid box can be regarded as a live view image which includes four objects having object identifiers of A, B, C and D respectively. Assuming that object A, object B and object C are objects to be removed, the user can select the objects to be removed in the live view image according to a preset order, while the digital camera can receive, according to the preset order, selecting instructions, which are transmitted by the user, for the at least one object to be removed in the live view image, and can respectively mark each of the at least one object to be removed according to the preset order so as to obtain a selected live view image, where a marked region is not smaller than a region of the corresponding object to be removed in area.

In present embodiments, optionally, selecting boxes can be used as marks for framing the objects to be removed. Each selecting box respectively corresponds to one object to be removed, and can be labeled according to the preset order. That is, objects to be removed are assigned numbers for indicating the preset order. In an image shown in FIG. 2B, dotted boxes around the objects to be removed indicate selecting boxes corresponding to the objects to be removed. In present embodiments, label number of each selection box can be consistent with the assigned number of the object to be removed corresponding thereto for indicating such correlation.

S102: After receiving a shooting instruction, removing the objects to be removed in the selected live view image successively according to the preset order to obtain a photograph.

Exemplarily, after receiving a shooting instruction, the selected live view image can be stored in a data buffer, so that the selected live view image can be post-processed within the data buffer. In present embodiments, the image shown in FIG. 2B can be stored in the data buffer to be post-processed.

Figure 3:
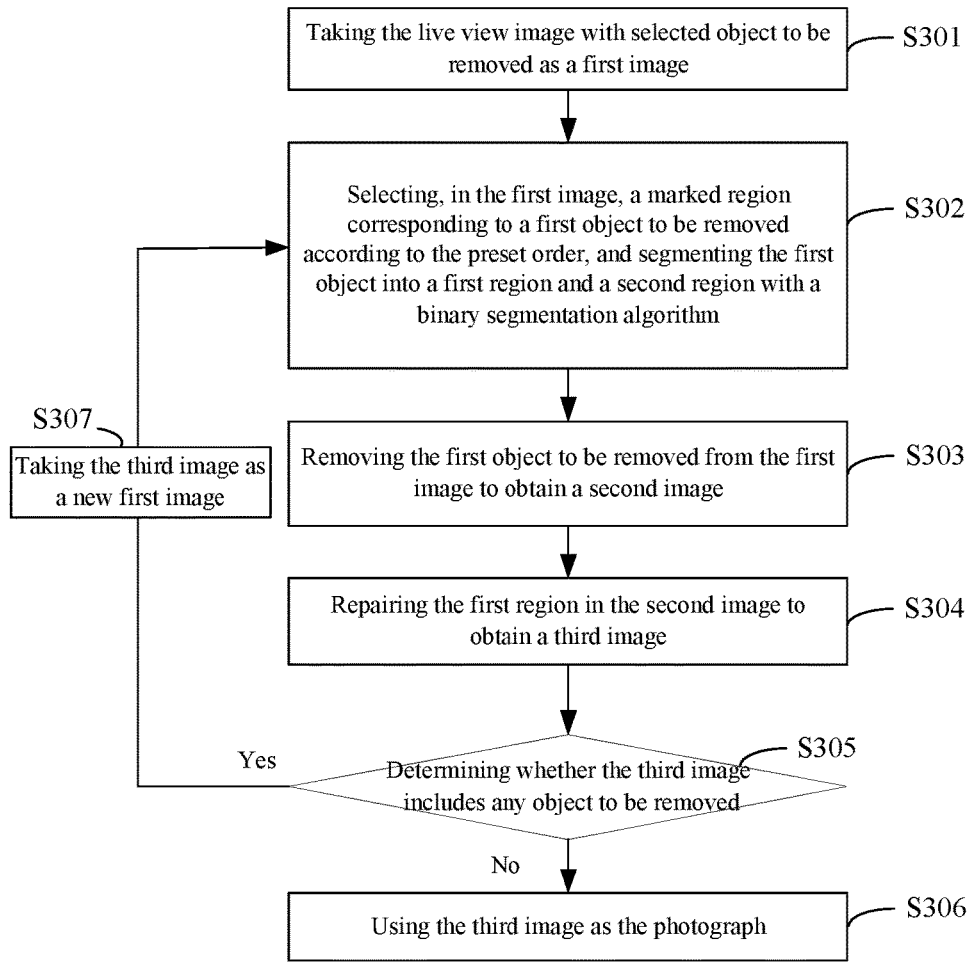
FIG. 3 is a flow diagram showing obtaining a photograph provided in embodiments of the present disclosure.

Exemplarily, the at least one object to be removed in the live view image is removed sequentially according to the preset order to obtain the photograph. A specific process is shown in FIG. 3, including the following steps:

S301: Taking the selected live view image as a first image.

Figure 2A:
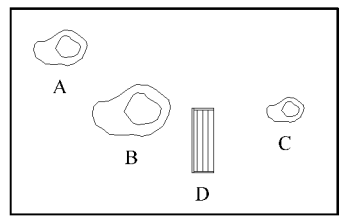
FIG. 2A is a schematic diagram showing a live view image provided in embodiments of the present disclosure.
Figure 2B:
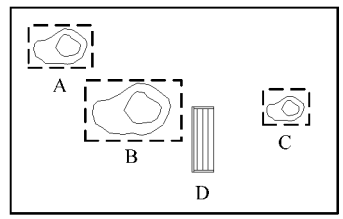
FIG. 2B is a schematic diagram showing a live view image with selected object to be removed provided in embodiments of the present disclosure.

Optionally, in present embodiments, the image, shown in FIG. 2B, stored in the data buffer can be used as the first image.

S302: Selecting a marked region, in the first image, corresponding to a first object to be removed according to the preset order, segmenting the first image into a first region and a second region with a binary segmentation algorithm. The region of the first object to be removed in the marked region is the first region, and a region excluding the first region in the first image is the second region.

Optionally, in present embodiments, the preset order may be the object identifiers order of the objects to be removed in FIG. 2B. Therefore, in the first image shown in FIG. 2B, the object A to be removed in the selecting box A can be used as the first object to be removed, the first object to be removed is the first region, and the rest region excluding the first object to be removed is the second region, as shown in FIG. 2C.

Optionally, the binary segmentation algorithm in present embodiments may be an interactive segmentation algorithm based on a Graph cuts technology for achieving segmentation of the first region, while a specific process based on the Graph cuts technology is a usual means to those skilled in the art and will not be repeated herein.

S303: Removing the first region (that is, the first object to be removed) from the first image to obtain a second image.

Figure 2C:
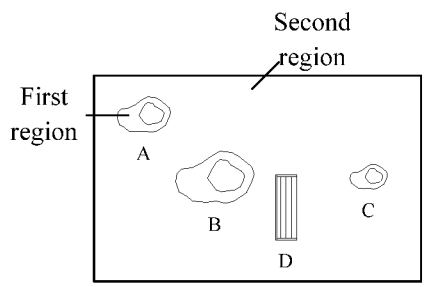
FIG. 2C is a schematic diagram showing a segmented first image provided in embodiments of the present disclosure.
Figure 2D:
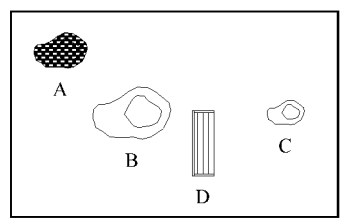
FIG. 2D is a schematic diagram showing a second image provided in embodiments of the present disclosure.

Optionally, in present embodiments, the first region in the image shown in FIG. 2C can be removed so as to obtain the second image shown in FIG. 2D. It can be understood that a condition of image loss certainly occurs in the first region in the second image after removing the first object to be removed. Therefore, the first region is a region to be repaired in subsequent steps, and can be indicated with shadows in the second image.

S304: Repairing the first region in the second image to obtain a third image.

Figure 2E:
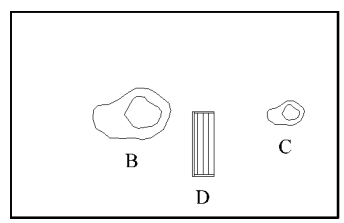
FIG. 2E is a schematic diagram showing a third image provided in embodiments of the present disclosure.

Optionally, for the second image shown in FIG. 2D, the removed first region can be repaired to obtain the third image shown in FIG. 2E. In the third image, the first region has already been repaired.

Figure 4:
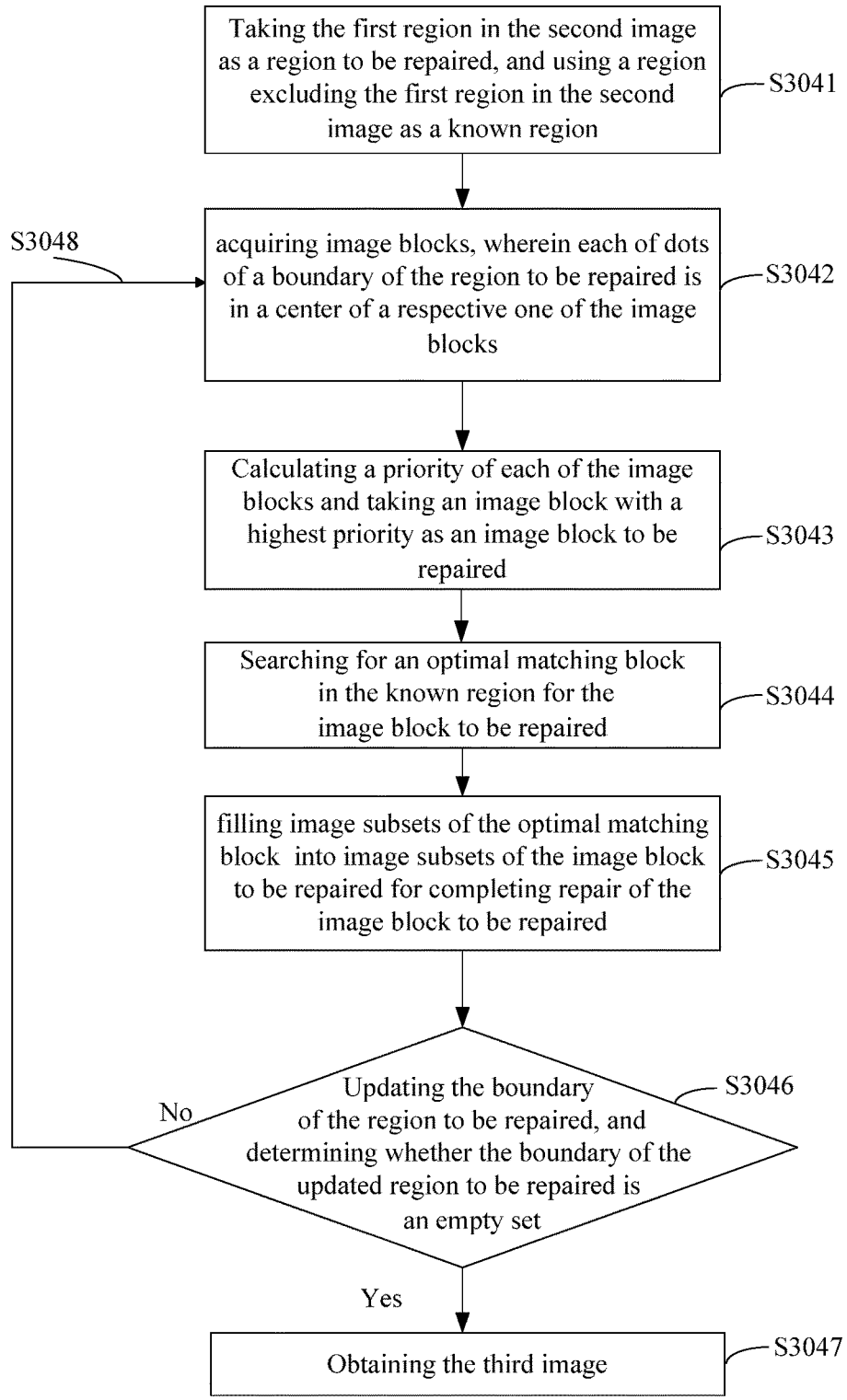
FIG. 4 is a flow diagram showing a repairing process provided in embodiments of the present disclosure.

As shown in FIG. 4 in details, the repairing process in step S304 can include the following steps:

S3041: Taking the first region in the second image as a region to be repaired, and taking a region excluding the first region in the second image as a known region.

S3042: Acquiring a plurality of image blocks. The boundary of the region to be repaired includes a plurality of dots. Each of the plurality of dots corresponds to a respective one of the plurality of image blocks and locates at the center of the corresponding image block.

Each image block has a preset size and each image block is on the boundary of the region to be repaired. Consequently, each image block may include image subsets respectively located in the region to be repaired and image subsets respectively located in the known region.

S3043: Calculating a priority of each image block and taking an image block with a highest priority as an image block to be repaired.

For example, the image block with a highest priority is an image block which has a minimum damage degree.

S3044: Searching, in the known region, for an optimal matching block for the image block to be repaired.

In present embodiment, step S3044 may specifically include:

Searching for matching blocks in the known region.

For each pixel in one matching block, calculating a difference in color value between the pixel in the matching block and the corresponding pixel in the image block to be repaired, and calculating a square of the difference in color value. Calculating a sum of the squares of differences based on all pixels in one matching block and pixels in the image block to be repaired. Calculating sum of the squares for each of matching blocks and selecting a matching block having a minimum sum of squares as the optimal matching block for the image block to be repaired.

When the number of matching blocks, each of which has the same minimum sum of squares is more than one, a matching block closest to the image block to be repaired is selected as the optimal matching block.

S3045: Filling image subsets in the optimal matching block to the corresponding image subsets in the image block to be repaired for completing repair of the block to be repaired.

S3046: Updating the boundary of the region to be repaired; determining whether the boundary of the updated region to be repaired is an empty set; if the updated region to be repaired is an empty set, executing step S3047; if the updated region to be repaired is not an empty set, executing step S3048.

It should be noted that after repair, the image block which has been repaired belongs to the known region and does not belong to the region to be repaired any longer; therefore, the region to be repaired and the boundary thereof are required to be updated.

S3047: Obtaining the third image when the boundary of the updated region to be repaired is an empty set, and ending the current processing flow.

It should be noted that when the boundary of the updated region to be repaired is an empty set, i.e., when no dot exists on the boundary of the updated region to be repaired, it can be understood that the repair of the entire region to be repaired is already completed at this moment so as to obtain the third image.

S3048: Executing step S3042 on the boundary of the updated region to be repaired when the boundary of the updated region to be repaired is not an empty set.

It should be noted that when the boundary of the updated region to be repaired is not an empty set, i.e., when a dot exists on the boundary of the updated region to be repaired, it can be understood that the repair of the entire region to be repaired is not completed at this moment; therefore, it is required to return to step S3042 for continuing to process the boundary of the updated region to be repaired until the boundary of the updated region to be repaired is an empty set.

S305: Determining whether the third image includes any object to be removed; if the third image includes any object to be removed, executing step S307; if the third image does not include object to be removed, executing step S306.

S306: Using the third image as a photograph, and ending the current processing flow when the third image does not include object to be removed.

It should be noted that if the number of the object to be removed in the live view image is one, no object to be removed exists in the third image; therefore, the third image at this moment is a photograph.

S307: taking the third image as a new first image, and returning to execute step S302 when the third image includes object to be removed.

Figure 2F:
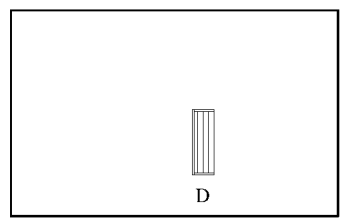
FIG. 2F is a schematic diagram showing a photograph provided in embodiments of the present disclosure.

It should be noted that if the number of the object to be removed in the live view image is more than one, as shown in FIG. 2A in present embodiments, the third image shown in FIG. 2E still includes object B to be removed and object C to be removed; therefore, the third image is required to be used as a new first image; and removal process operation is repeatedly executed from step S302 for successively removing the object B to be removed and the object C to be removed until no object to be removed exists in the third image obtained finally, thereby obtaining a photograph, as shown in FIG. 2F.

Embodiments of the present disclosure provide a photographing processing method, including selecting objects to be removed in a live view image according to a preset order; and after receiving a shooting instruction, removing the objects to be removed in the selected live view image sequentially according to the preset order to obtain a photograph. As such, the present disclosure is capable of achieving that obstacles are removed in a photographing process, and is convenient in operation and simple in implementation.

Figure 5:
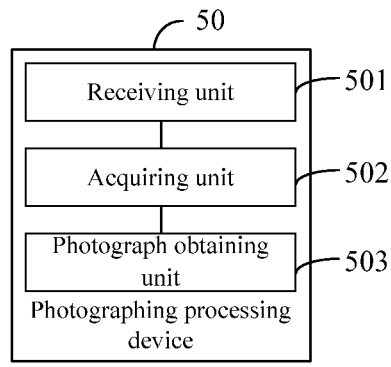
FIG. 5 is a structural diagram showing a photographing processing device provided in embodiments of the present disclosure.

As shown in FIG. 5, a photographing processing device 50 provided in embodiments of the present disclosure can be applied to a terminal device having a digital capture function, such as an intelligent mobile phone, a digital camera, a tablet personal computer, etc. To clearly describe the technical solutions of present embodiments, the device is described by using the digital camera as an example, and it should be noted that it does not mean that the device is only suitable for the digital camera. The device includes a receiving unit 501, an acquiring unit 502, and a photograph obtaining unit 503.

The receiving unit 501 can be a storage device such as a memory, a programmable logic gate array, etc., configured for receiving at least one instruction for selecting at least one object to be removed in a live view image according to a preset order, and receiving a shooting instruction.

The acquiring unit 502 is configured for acquiring a live view image with selected object to be removed.

The photograph obtaining unit 503 can be a processor such as a CPU, an image processor, etc., configured for removing the objects to be removed in the selected live view image sequentially according to the preset order after receiving, by the receiving unit 501, a shooting instruction, to obtain a photograph.

Exemplarily, when the digital camera including the photographing processing device 50 is used by a user for capturing photos, unwanted obstacles may appear usually in a live view image in a view finding frame. The obstacles are known as objects to be removed in embodiments of the present disclosure. It can be understood that the number of the objects to be removed in the live view image may be more than one. In an image shown in FIG. 2A, an object A, an object B and an object C are three objects to be removed. The user can select the objects to be removed in the live view image according to a preset order, while the receiving unit 501 can receive at least one instruction, from the user, for selecting at least one object to be removed in a live view image according to the preset order, and the acquiring unit 502 can mark the at least one object to be removed according to the preset order so as to obtain a selected live view image, where each marked region is not smaller than the region of the corresponding object to be removed.

In present embodiments, optionally, selection boxes can be used as marks by the acquiring unit 502 for framing the objects to be removed. Each selection box corresponds to a respective one object to be removed, and can be numbered according to the preset order. That is, objects to be removed are numbered for indicating the preset order. In an image shown in FIG. 2B, dotted line frames around the objects to be removed indicate selection boxes corresponding to the objects to be removed. In present embodiments, the number of each selection box can be consistent with the number of the object to be removed corresponding thereto for indicating such correlation.

Exemplarily, after receiving a shooting instruction, the selected live view image can be stored in a data buffer by the photograph obtaining unit 503 for subsequently processing in the data buffer. In present embodiments, the image shown in FIG. 2B can be stored in the data buffer by the photograph obtaining unit 503 for post-processing.

Figure 6:
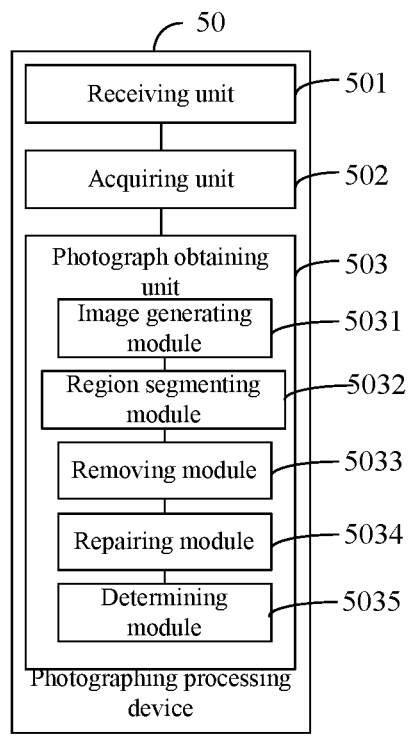
FIG. 6 is a structural diagram showing another photographing processing device provided in embodiments of the present disclosure.

Specifically, as shown in FIG. 6, the photograph obtaining unit 503 can include: an image generating module 5031, a region segmentation module 5032, a removing module 5033, a repairing module 5034, and a determining module 5035.

The image generating module 5031 is configured for taking the selected live view image as a first image.

Optionally, in present embodiments, the image generating module 5031 can use the image, as shown in FIG. 2B, stored in the data buffer as the first image.

The region segmentation module 5032 is configured for selecting a marked region corresponding to a first object to be removed according to the preset order in the first image obtained by the image generating module 5031, and for segmenting the first image into a first region and a second region with a binary segmentation algorithm, where the region of the first object to be removed in the marked region is the first region, and a region excluding the first region in the first image is the second region.

Optionally, in present embodiments, the preset order may be the object number order of the objects to be removed in FIG. 2B. Therefore, in the first image shown in FIG. 2B, object A to be removed in the selection box A can be used as a first object to be removed by the region segmentation module 5032, the first object to be removed is the first region, and a rest region except the first object to be removed is the second region, as shown in FIG. 2C.

Preferably, the binary segmentation method in present embodiments may be an interactive segmentation algorithm based on a graph cuts technology for achieving division of the first region, while a specific process based on the graph cuts technology is a usual means of those skilled in the art and will not be repeated herein.

The removing module 5033 is configured for removing the first region segmented by the region segmentation module 5032 in the first image to obtain a second image.

Optionally, in present embodiments, the first region in the image shown in FIG. 2C can be removed by the removing module 5033 so as to obtain the second image shown in FIG. 2D. It can be understood that a condition of image loss certainly occur in the first region in the second image after removing the first object to be removed by the removing module 5033. Therefore, the first region is a region to be repaired in subsequent steps, and can be indicated with shadows in the second image.

The repairing module 5034 is configured for repairing the removed first region in the second image obtained by the removing module 5033 to obtain a third image.

Optionally, the repairing module 5034 can be specifically configured for performing step D1, step D2, step D3, step D4, step D5, step D6.

In step D1, the first region in the second image is taken as a region to be repaired, and a region excluding the first region in the second image is used as a known region.

In step D2, image blocks are acquired, where a center of each of the image blocks corresponds to a dot on a boundary of the region to be repaired Each image block has a preset size and it can be understood that because each image block is on the boundary of the region to be repaired, each image block consists of image subsets respectively located on the region to be repaired and image subsets respectively located on the known region.

In step D3, a priority of each image block is calculated and an image block with a highest priority is taken as an image block to be repaired.

In step D4, an optimal matching block for the image block to be repaired is searched in the known region.

In present embodiments, the step D4 can specifically include: searching for matching blocks in the known region, and selecting, from the matching blocks, the optimal matching block for the image block to be repaired. The optimal matching block has a minimum sum of squares of differences in color value between pixels in matching block and corresponding pixels in the image block to be repaired. Further, when the quantity of matching blocks, each of which has the same minimum sum of squares is more than one, a matching block closest to the image block to be repaired is selected as the optimal matching block.

In step D5, filling image subsets of the optimal matching block into image subsets of the image block to be repaired for completing repair of the block to be repaired.

In step D6, the boundary of the region to be repaired is updated; and the third image is obtained when the boundary of the updated region to be repaired is an empty set; and executing step D2 on the boundary of the updated region to be repaired when the boundary of the updated region to be repaired is not an empty set.

Further, after repair of the image block to be repaired is completed, the block to be repaired belongs to the known region and does not belong to the region to be repaired any longer; therefore, the repairing module 5034 needs to update the region to be repaired and the boundary thereof. Moreover, when the boundary of the updated region to be repaired is an empty set, i.e., when no dot exists on the boundary of the updated region to be repaired, it can be understood that the repair of the entire region to be repaired is already completed at this moment so as to obtain the third image.

Further, when the boundary of the updated region to be repaired is not an empty set, i.e., when a dot exists on the boundary of the updated region to be repaired, it can be understood that the repair of the entire region to be repaired is not completed at this moment; therefore, the repairing module 5034 needs to return to step D2 for continuing to process the boundary of the updated region to be repaired until the boundary of the updated region to be repaired is an empty set.

The determining module 5035 is configured for determining whether the third image obtained by the repairing module 5034 includes any object to be removed.

The image generating module 5031 is also configured for taking the third image as a photograph when the determining module 5035 determines that the third image does not include any object to be removed, and generating the third image as a new first image, and transmitting the new first image to the region segmentation module 5032 when the determining module 5035 determines that the third image includes object to be removed.

It should be noted that if the number of the object to be removed in the live view image is one, no object to be removed exists in the third image; therefore, the third image at this moment is a photograph.

However, if the number of the object to be removed in the live view image is more than one, as shown in FIG. 2A in present embodiments, the third image shown in FIG. 2E also includes object B to be removed and object C to be removed. Therefore, the image generating module 5031 needs to use the third image as a new first image and transmit the third image to the region segmentation module 5032 for removing the object B until no object to be removed exists in the third image obtained finally, thereby obtaining a photograph, as shown in FIG. 2F.

Embodiments of the present disclosure provide a photographing processing device 60, which can be used for obtaining a photograph by selecting objects to be removed in a live view image according to a preset order, and after receiving a one-time capture instruction, removing the objects to be removed in the selected live view image sequentially according to the preset order. As such, the present disclosure is capable of achieving that obstacles are removed in a photographing process, and is convenient in operation and simple in implementation.

Those skilled in the art should understand that embodiments of the present disclosure can provide a method, system or computer program product. Therefore, the present disclosure can be implemented in a form of hardware, a form of software or a form of combination of software and hardware. Moreover, the present disclosure can adopt a form of a computer program product capable of being implemented on one or more computer available storage media (including but not limited to disk memory, optical memory, etc.) containing computer available program codes.

The present disclosure is described with reference to flowchart illustrations and/or block diagrams of methods, apparatus (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on computer or other programmable apparatus provide process for implementing the functions/acts specified in the flowchart and/or block diagram block or blocks.

Accordingly, embodiments of the present disclosure also provide a computer storage medium in which a computer program is stored, where the computer program is used for executing the photographing processing method in embodiments of the present disclosure.

The above descriptions are merely embodiments of the present disclosure, but are not intended to limit the protection scope of the present disclosure.

The invention claimed is:

1. A photographing processing method, comprising:
   receiving at least one instruction for selecting at least one object to be removed in a live view image according to a preset order, and acquiring a live view image with selected object to be removed; and
   after receiving a shooting instruction, removing the at least one object to be removed in the live view image with selected object to be removed sequentially according to the preset order to obtain a photograph,
   wherein after receiving a shooting instruction, removing the at least one object to be removed in the live view image with selected object to be removed sequentially according to the preset order to obtain a photograph comprises:
   step A: taking the live view image with selected object to be removed as a first image;
   step B: selecting, in the first image, a marked region corresponding to a first object to be removed according to the preset order, and segmenting the first image into a first region and a second region with a binary segmentation algorithm, wherein the region of the first object to be removed in the marked region is the first region, and a region excluding the first region in the first image is the second region;
   step C: removing the first object to be removed from the first image to obtain a second image;
   step D: repairing the first region in the second image to obtain a third image;
   step E: taking the third image as the photograph when the third image does not include any object to be removed; and taking the third image as a new first image, and returning to execute step B when the third image includes other object to be removed.

2. The method according to claim 1, wherein acquiring a live view image with selected object to be removed comprises:
   respectively marking each of the at least one object to be removed according to the preset order to obtain the live view image with selected object to be removed, wherein each marked region is not smaller than a region of a corresponding object to be removed.

3. The method according to claim 1, wherein repairing the first region in the second image to obtain a third image comprises:
   step D1: taking the first region in the second image as a region to be repaired, and using a region excluding the first region in the second image as a known region;
   step D2: acquiring image blocks, wherein each of dots of a boundary of the region to be repaired is in a center of a respective one of the image blocks;
   step D3: calculating a priority of each of the image blocks and taking an image block with a highest priority as an image block to be repaired;
   step D4: searching for an optimal matching block in the known region for the image block to be repaired;
   step D5: filling image subsets, corresponding to the image block into image subsets of the image block to be repaired;
   step D6: updating the boundary of the region to be repaired; obtaining the third image when the boundary of the updated region to be repaired is an empty set; and executing step D2 on the boundary of the updated region to be repaired when the boundary of the updated region to be repaired is not an empty set.

4. The method according to claim 3, wherein searching for an optimal matching block in the known region for the image block to be repaired comprises:
   searching for matching blocks in the known region; and generating a matching block, which is in the known region and has a minimum sum of squares of differences in color value between pixels in matching block and corresponding pixels in the image block to be repaired, as the optimal matching block.

5. The method according to claim 4, further comprising:
when a quantity of matching blocks, each of which is in the known region and has a same minimum sum of squares of differences in color value between pixels in matching block and corresponding pixels in the image block to be repaired, is more than one, selecting a matching block closest to the image block to be repaired as the optimal matching block.

6. A photographing processing device, comprising:
a processor; and
a memory for storing instructions,
wherein the processor is configured to execute the instructions to:
receive at least one instruction for selecting at least one object to be removed in a live view image according to a preset order;
acquire a live view image with selected object to be removed; and
remove the at least one object to be removed in the live view image with selected object to be removed sequentially according to the preset order to obtain a photograph,
wherein during the removing of the at least one object to be removed, the processor is configured to:
take the live view image with selected object to be removed as a first image;
select a marked region corresponding to a first object to be removed according to the preset order in the first image, and segment the first image into a first region and a second region with a binary segmentation algorithm, wherein the region of the first object to be removed in the marked region is the first region, and a region excluding the first region in the first image is the second region;
remove the first object to be removed from the first image to obtain a second image;
repair the first region in the second image obtained by the removing module to obtain a third image; and
determine whether the third image obtained by the repairing module includes any object to be removed, wherein the processor is configured to take the third image as a photograph when the third image does not include any object to be removed, and use the third image as a new first image, and transmitting the new first image to the region segmenting module when the third image includes other object to be removed.

7. The device according to claim 6, wherein during the acquisition of the live view image with selected object to be removed, the processor is configured to respectively mark each of the at least one object to be removed according to the preset order to obtain the live view image with selected object to be removed, wherein each marked region is not smaller than a region of the corresponding object to be removed.

8. The device according to claim 6, wherein during the repairing of the first region, the processor is configured to:
step D1: take the first region in the second image as a region to be repaired, and use a region excluding the first region in the second image as a known region;
step D2: acquire image blocks, wherein each of dots of a boundary of the region to be repaired is in a center of a respective one of the image blocks;
step D3: calculate a priority of each of the image blocks and take an image block with a highest priority as an image block to be repaired;
step D4: search for an optimal matching block in the known region for the image block to be repaired;
step D5: fill image subsets, corresponding to the image block to be repaired, of the optimal matching block into image subsets of the image block to be repaired for completing repair of the image block to be repaired;
step D6: update the boundary of the region to be repaired; obtain the third image when the boundary of the updated region to be repaired is an empty set; and execute step D2 on the boundary of the updated region to be repaired when the boundary of the updated region to be repaired is not an empty set.

9. The device according to claim 8, wherein searching for an optimal matching block in the known region for the image block to be repaired comprises:
searching for matching blocks in the known region; and
generating a matching block, which is in the known region and has a minimum sum of squares of differences in color value between pixels in matching block and corresponding pixels in the image block to be repaired, as the optimal matching block.

10. The device according to claim 9, wherein searching for an optimal matching block in the known region for the image block to be repaired further comprises:
when a quantity of matching blocks, each of which is in the known region and has a same minimum sum of squares of differences in color value between pixels in matching block and corresponding pixels in the image block to be repaired, is more than one, selecting a matching block closest to the image block to be repaired as the optimal matching block.

11. A non-transitory computer storage medium storing a computer program for executing a photographing processing method, wherein the method comprises of
receiving at least one instruction for selecting at least one object to be removed in a live view image according to a preset order, and acquiring a live view image with selected object to be removed; and
after receiving a shooting instruction, removing the at least one object to be removed in the live view image with selected object to be removed sequentially according to the preset order to obtain a photograph,
wherein after receiving a shooting instruction, removing the at least one object to be removed in the live view image with selected object to be removed sequentially according to the preset order to obtain a photograph comprises:
step A: taking the live view image with selected object to be removed as a first image;
step B: selecting, in the first image, a marked region corresponding to a first object to be removed according to the preset order, and segmenting the first image into a first region and a second region with a binary segmentation algorithm, wherein the region of the first object to be removed in the marked region is the first region, and a region excluding the first region in the first image is the second region;
step C: removing the first object to be removed from the first image to obtain a second image;
step D: repairing the first region in the second image to obtain a third image;
step E: taking the third image as the photograph when the third image does not include any object to be removed; and taking the third image as a new first image, and returning to execute step B when the third image includes other object to be removed.

12. The non-transitory computer storage medium according to claim 11, wherein acquiring a live view image with selected object to be removed comprises:

respectively marking each of the at least one object to be removed according to the preset order to obtain the live view image with selected object to be removed, wherein each marked region is not smaller than a region of a corresponding object to be removed.

13. The non-transitory computer storage medium according to claim 11, wherein repairing the first region in the second image to obtain a third image comprises:
   step D1: taking the first region in the second image as a region to be repaired, and using a region excluding the first region in the second image as a known region;
   step D2: acquiring image blocks, wherein each of dots of a boundary of the region to be repaired is in a center of a respective one of the image blocks;
   step D3: calculating a priority of each of the image blocks and taking an image block with a highest priority as an image block to be repaired;
   step D4: searching for an optimal matching block in the known region for the image block to be repaired;
   step D5: filling image subsets of the optimal matching block into image subsets of the image block to be repaired;
   step D6: updating the boundary of the region to be repaired; obtaining the third image when the boundary of the updated region to be repaired is an empty set; and executing step D2 on the boundary of the updated region to be repaired when the boundary of the updated region to be repaired is not an empty set.

14. The non-transitory computer storage medium according to claim 13, wherein searching for an optimal matching block in the known region for the image block to be repaired comprises:
   searching for matching blocks in the known region; and
   generating a matching block, which is in the known region and has a minimum sum of squares of differences in color value between pixels in matching block and corresponding pixels in the image block to be repaired, as the optimal matching block.

15. The non-transitory computer storage medium according to claim 14, wherein the method further comprises:
   when a quantity of matching blocks, each of which is in the known region and has a same minimum sum of squares of differences in color value between pixels in matching block and corresponding pixels in the image block to be repaired, is more than one, selecting a matching block closest to the image block to be repaired as the optimal matching block.

\* \* \* \* \*